US011339740B1

(12) United States Patent
Zhao et al.

(10) Patent No.: US 11,339,740 B1
(45) Date of Patent: May 24, 2022

(54) METHODS AND SYSTEM FOR MANAGING FUEL CUT OFF FOR HYBRID VEHICLES (71) Applicant: Ford Global Technologies, LLC, Dearborn, MI (US)

(72) Inventors: Yanan Zhao, Ann Arbor, MI (US); Judhajit Roy, Royal Oak, MI (US); Christopher John Teslak, Plymouth, MI (US); Ralph Wayne Cunningham, Milan, MI (US); Rajit Johri, San Francisco, CA (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/167,966

(22) Filed: Feb. 4, 2021

(51) Int. Cl.
*F02D 41/38* (2006.01)
*F02D 41/08* (2006.01)

(52) U.S. Cl.
CPC .............. *F02D 41/38* (2013.01); *F02D 41/08* (2013.01); *F02D 2200/503* (2013.01); *F02D 2200/602* (2013.01)

(58) Field of Classification Search
CPC .... F02D 41/38; F02D 41/08; F02D 2200/503; F02D 2200/602
See application file for complete search history.

(56) References Cited

U.S. PATENT DOCUMENTS

| | | | | |
|---|---|---|---|---|
| 5,553,581 A * | 9/1996 | Hirabayashi | .......... | F02D 11/107 123/399 |
| 5,979,402 A * | 11/1999 | Melbourne | ........... | F02D 31/008 123/339.16 |
| 6,564,765 B2 | 5/2003 | Kuroda et al. | | |
| 2003/0100975 A1* | 5/2003 | Hashimoto | ........... | F02D 11/107 701/1 |
| 2003/0203790 A1* | 10/2003 | Matsubara | ............ | B60W 30/18 477/107 |
| 2004/0237514 A1* | 12/2004 | Surnilla | ................ | F01N 13/009 60/299 |
| 2005/0000481 A1 | 1/2005 | Asakawa et al. | | |
| 2005/0193997 A1* | 9/2005 | Cullen | ................... | F02M 43/00 123/698 |
| 2005/0197759 A1* | 9/2005 | Surnilla | .................. | F02D 17/02 701/103 |
| 2009/0105896 A1* | 4/2009 | Tamai | .................. | B60W 10/115 701/22 |
| 2009/0159351 A1* | 6/2009 | Ando | ...................... | B60L 58/15 180/65.265 |
| 2012/0089309 A1* | 4/2012 | Kim | ....................... | B60W 10/08 701/58 |
| 2012/0296541 A1* | 11/2012 | Matsushita | ........... | F02D 41/045 701/70 |
| 2013/0146022 A1* | 6/2013 | Kim | ...................... | F02D 41/021 123/333 |
| 2013/0196820 A1* | 8/2013 | Suzuki | ................... | F02D 29/02 477/181 |

(Continued)

*Primary Examiner* — Joseph J Dallo
(74) *Attorney, Agent, or Firm* — David Kelley; McCoy Russell LLP (57) ABSTRACT

Systems and methods for operating an engine that may selectively enter and exit a fuel cut-off mode are described. In one example, the method holds the engine in the fuel cut-off mode even though a propulsive effort pedal is applied. An electric machine may provide torque to a vehicle driveline while the engine is in the fuel cut-off mode.

19 Claims, 6 Drawing Sheets

(56) References Cited

U.S. PATENT DOCUMENTS

| | | | |
|---|---|---|---|
| 2015/0006060 A1* | 1/2015 | Ly | F02D 41/123 |
| | | | 701/104 |
| 2016/0138514 A1* | 5/2016 | Carboni | F02D 41/3863 |
| | | | 123/459 |
| 2017/0008527 A1* | 1/2017 | Nishida | B60W 10/06 |
| 2019/0277215 A1* | 9/2019 | Tanaka | F02D 41/022 |
| 2020/0102928 A1* | 4/2020 | Kinoshita | F02D 41/123 |
| 2020/0141341 A1* | 5/2020 | Muta | B60L 50/15 |
| 2020/0263650 A1* | 8/2020 | Okubo | F02D 41/0295 |
| 2021/0114598 A1* | 4/2021 | Byun | B60W 10/06 |

\* cited by examiner

METHODS AND SYSTEM FOR MANAGING FUEL CUT OFF FOR HYBRID VEHICLES

FIELD

The present description relates to methods and a system for managing operation of an engine that enters a fuel cut-off mode.

BACKGROUND AND SUMMARY

A vehicle may include an engine that enters a fuel cut-off mode from time to time to conserve fuel. The fuel cut-off mode may include rotating the engine via the vehicle's inertia while ceasing to supply fuel to the engine. The fuel cut-off mode may be entered after a human driver of the vehicle fully releases the vehicle's propulsive effort pedal. The engine may be reactivated by injecting fuel to the engine in response to driver demand torque increasing or an increase in the position of the vehicle's propulsive effort pedal. If the vehicle's propulsive effort pedal is released again shortly after it was most recently applied, fuel may have been unnecessarily used to restart the engine before the engine enters fuel cut-off mode for a second time. Therefore, it may be desirable to provide a way of entering and exiting a fuel cut-off mode so that fuel may not be consumed unnecessarily.

The inventors herein have recognized the above-mentioned issues and have developed a method for operating an engine, comprising: entering the engine into a fuel cut-off mode; and causing the engine to remain in the fuel cut-off mode when a propulsive effort pedal is applied according to a classification of a tip-in of the propulsive effort pedal.

By causing the engine to remain in a fuel cut-off mode while a propulsive effort pedal is applied, it may be possible to provide the technical result of extending a fuel cut-off period so that engine fuel economy may be improved. In addition, an electric machine may provide output to meet driver demand and overcome engine friction so that the engine may continue to rotate while a vehicle is propelled via the electric machine to meet driver requirements. The fuel cut-off mode may be exited in response to an amount of time a vehicle has remained in the fuel cut-off mode and in response to an amount of electric energy that is consumed via the electric machine.

The present description may provide several advantages. In particular, the approach may improve fuel efficiency of an engine. Further, the approach may reduce unnecessary engine starting and engine starting emissions. In addition, the approach may reduce short bursts of repeated engine starting and stopping.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating an engine that enters a fuel cut-off mode from time to time. The engine may be held in the fuel cut-off mode even though a propulsive effort pedal is applied so that engine restarts and emissions may be reduced. The engine may be of the type shown in FIG. 1. The engine may be included in a driveline as shown in FIG. 2. The engine may be operated according to the method of FIG. 3 for entering and exiting a fuel cut-off mode where the engine is rotated without being supplied with fuel. The engine may be operated according to the method of FIGS. 4-6.

Figure 1:
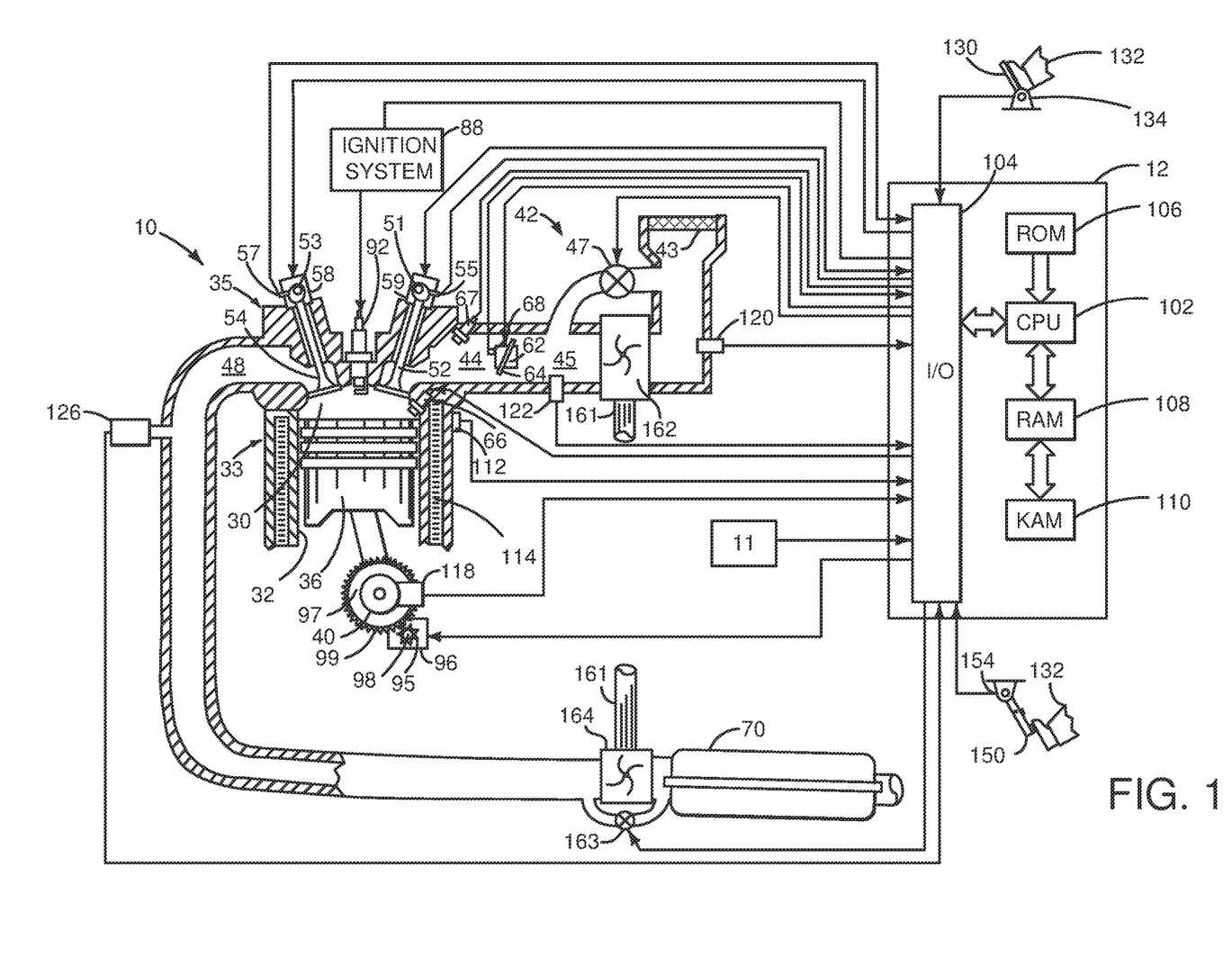
FIG. 1 is a schematic diagram of an engine.
Figure 2:
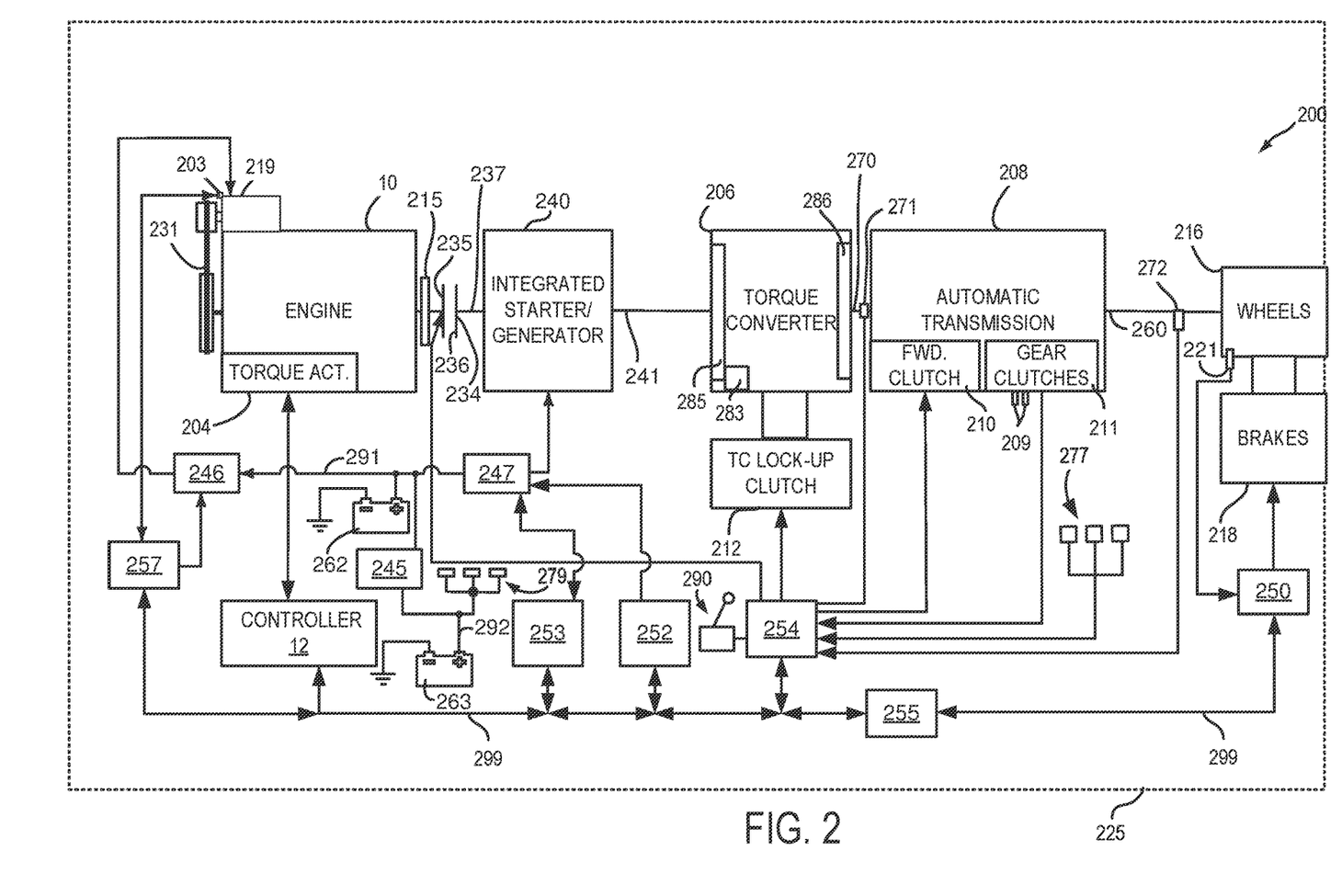
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42.

In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a propulsive effort pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase a speed of vehicle 225, vehicle system controller may obtain a driver demand power or power request from a propulsive effort pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine in a hybrid vehicle driveline; an electric machine that provides propulsive force to the hybrid vehicle driveline; a propulsive effort pedal; and a controller including executable instructions stored in non-transitory memory that cause the controller to hold the engine in a fuel cut-off mode while the propulsive effort pedal is applied less than a threshold amount and while the propulsive effort pedal rate of change is less than a threshold amount. The system further comprises additional instructions to remain in the fuel cut-off mode while an expected electric machine contribution torque is less than an electric machine torque contribution threshold. The system includes where the expected electric machine contribution torque is equal to a driver demand torque minus an engine friction torque. The system includes where the electric machine is a belt integrated starter generator. The system includes where the electric machine is an integrated starter/generator. The system further comprises additional instructions to exit the fuel cut-off mode in response to an actual total amount of time in the fuel cut-off mode exceeding a threshold amount of time. The system further comprises additional instructions to exit the fuel cut-off mode in response to an actual total amount of electric power consumed by the electric machine exceeding a threshold amount of power.

Figure 3:
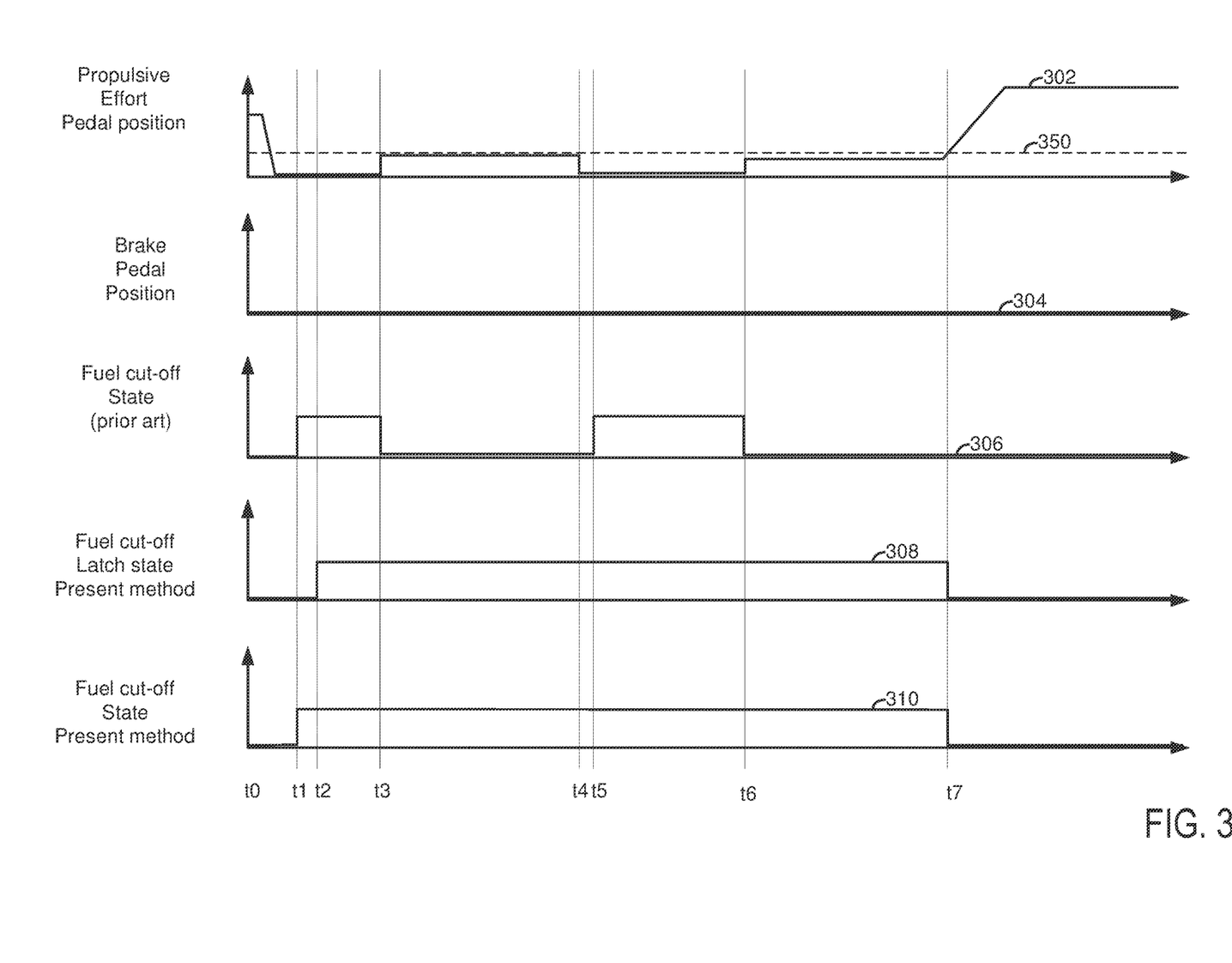
FIG. 3 shows an engine operating sequence according to the method of FIGS. 4-6.
Figure 4:
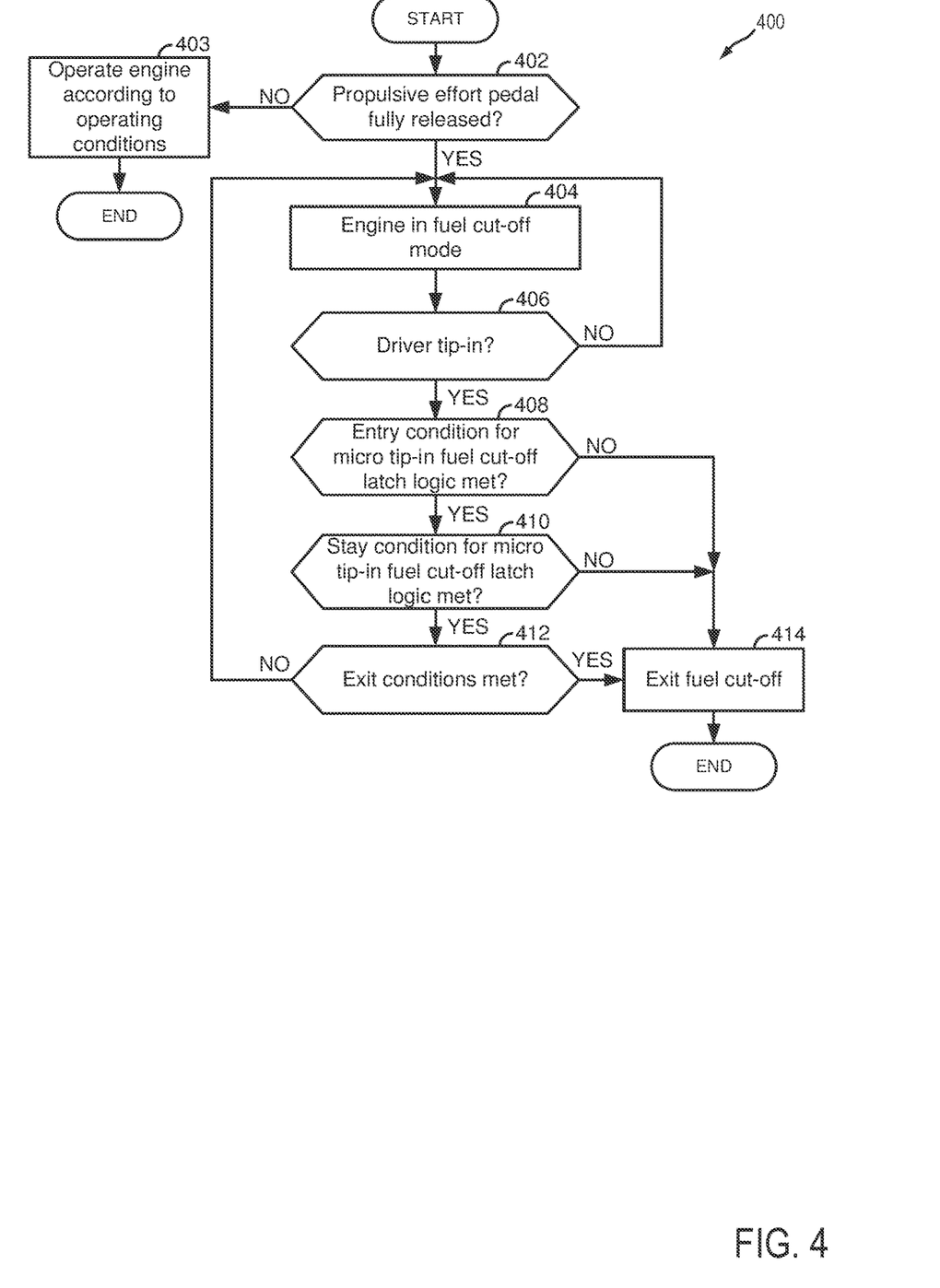
FIGS. 4-6 show a method for operating an engine that may enter a fuel cut-off mode.
Figure 5:
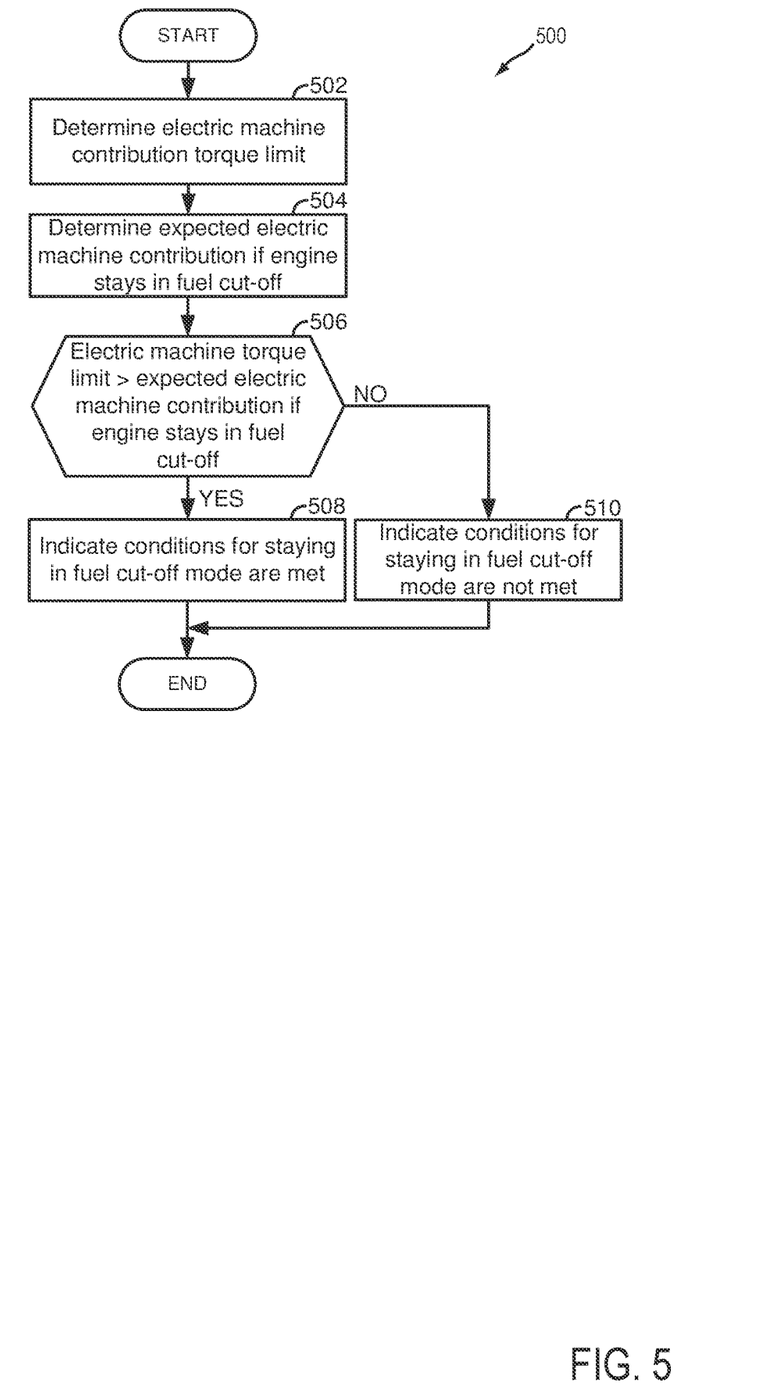
Figure 6:
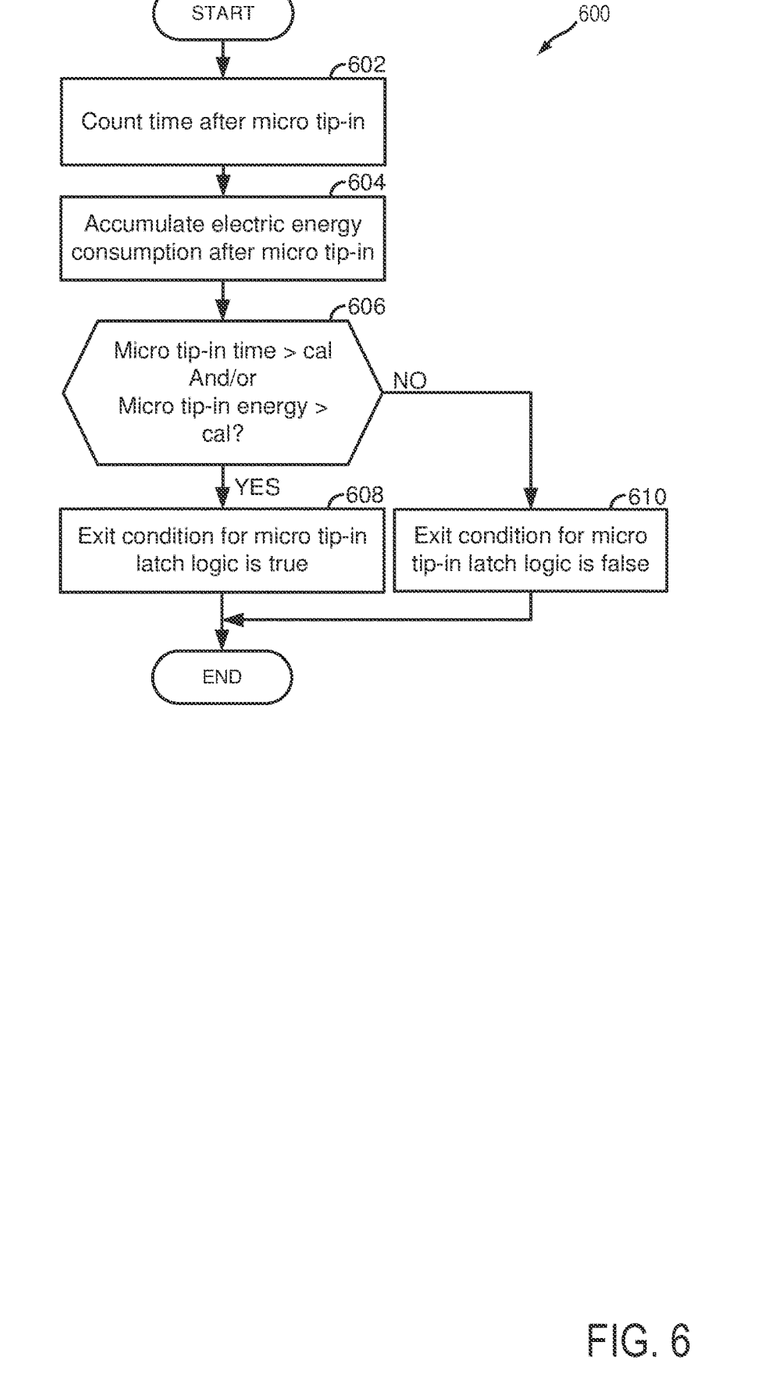

Referring now to FIG. 3, plots of an example prophetic engine operating sequence according to the method of FIGS. 4-6 is shown. The example sequence may be provided by the system of FIGS. 1 and 2 in cooperation with the method of FIGS. 4-6. The plots are aligned in time and occur at a same time. The vertical lines at t0-t7 indicate times of particular interest.

The first plot from the top of FIG. 3 is a plot of a propulsive effort pedal position versus time. The vertical axis represents propulsive effort pedal position and the propulsive effort pedal position increases in the direction of the vertical axis arrow. The horizontal axis represents time and the time increases from the left side of the figure to the right side of the figure. Trace 302 represents the propulsive effort pedal position. Horizontal line 350 represents an upper threshold for identifying micro tip-ins. Micro tip-ins (e.g., small applications of the propulsive effort pedal) may be identified via a position of a propulsive effort pedal and driver demand torque as elaborated further in the description of FIGS. 4-6.

The second plot from the top of FIG. 3 is a plot of a brake pedal position versus time. The vertical axis represents brake pedal position and the brake pedal position increases in the direction of the vertical axis arrow. The horizontal axis represents time and the time increases from the left side of the figure to the right side of the figure. Trace 304 represents the propulsive effort pedal position.

The third plot from the top of FIG. 3 is a plot of prior art engine fuel cut-off state versus time. The vertical axis represents the prior art engine fuel cut-off state and the prior art engine fuel cut-off state indicates that the engine is in fuel cut-off mode when trace 306 is at a higher level near the vertical axis arrow. The engine is not in the fuel cut-off state when trace 306 is near the horizontal axis. The horizontal axis represents time and the time increases from the left side of the figure to the right side of the figure. Trace 306 represents the prior art engine fuel cut-off state.

The fourth plot from the top of FIG. 3 is a plot of engine fuel cut-off latch state according to the present method versus time. The vertical axis represents the engine fuel cut-off latch state according to the present method and the engine fuel cut-off latch state according to the present method indicates that the engine fuel cut-off mode is latched (e.g., held active) when trace 308 is at a higher level near the vertical axis arrow. The fuel cut-off state is not latched when trace 308 is near the horizontal axis. The horizontal axis represents time and the time increases from the left side of the figure to the right side of the figure. Trace 308 represents the engine fuel cut-off state according to the present method.

The fifth plot from the top of FIG. 3 is a plot of engine fuel cut-off state according to the present method versus time. The vertical axis represents the engine fuel cut-off state according to the present method and the engine fuel cut-off state according to the present method indicates that the engine is in fuel cut-off mode when trace 310 is at a higher level near the vertical axis arrow. The engine is not in the fuel cut-off state when trace 310 is near the horizontal axis. The horizontal axis represents time and the time increases from the left side of the figure to the right side of the figure. Trace 310 represents the engine fuel cut-off state according to the present method.

At time t0, the engine is running (e.g., rotating and combusting fuel and air) not shown and the propulsive effort pedal is applied to a medium level. The brake pedal is not applied and the engine would not be in fuel cut-off mode according to the prior art method. In addition, the engine is not in fuel cut-off mode according to the present method nor is the fuel cut-off mode latched.

At time t1, the propulsive effort pedal has been fully released and the brake pedal is not applied. The prior art fuel cut-off method enters fuel cut-off at this time. Likewise, the present method enters fuel cut-off mode at this time. The present method does not latch the fuel cut-off at this time.

At time t2, the propulsive effort pedal remains fully released and the brake pedal is not applied. The prior art fuel cut-off method remains in fuel cut-off mode and the present method remains in fuel cut-off mode at this time. The present method also latches the fuel cut-off mode at time t2. The fuel cut-off mode may be latched a predetermined amount of time after the present method enters fuel cut-off mode.

At time t3, the propulsive effort pedal is applied a small amount and the brake pedal is not applied. The prior art fuel cut-off method would exit fuel cut-off at this time. The present method remains in fuel cut-off mode at this time because the fuel cut-off mode is latched and conditions for releasing the latch have not occurred. The tip-in is characterized as a micro tip-in. Therefore, the BISG or ISG may provide the requested torque to the driveline (not shown).

At time t4, the propulsive effort pedal has been fully released and the brake pedal is not applied. The prior art fuel cut-off method remains out of fuel cut-off mode at this time and the present method remains in fuel cut-off mode at this time since the fuel cut-off latch is still active.

At time t5, the propulsive effort pedal remains fully released and the brake pedal is not applied. The prior art fuel cut-off method would enter fuel cut-off at this time. The present method remains in fuel cut-off mode at this time and the fuel cut-off latch remains active.

At time t6, the propulsive effort pedal is applied a small amount and the brake pedal is not applied. The prior art fuel cut-off method would exit fuel cut-off at this time. The present method remains in fuel cut-off mode at this time because the fuel cut-off latch remains activated. The present tip-in is characterized as a micro tip-in by the method of FIGS. 4-6. The BISG or ISG (not shown) may provide the requested torque to the driveline (not shown).

At time t7, the propulsive effort pedal is applied further such that it causes the cut-off mode latch to be released according to the method of FIGS. 4-6. The engine also exits fuel cut-off mode so that a requested level of torque or power may be provided to the driveline. The prior art method remains out of fuel cut-off mode and the brake pedal is not applied.

Thus, the method of FIGS. 4-6 may increase an amount of time that an engine is in a fuel cut-off mode to decrease fuel consumption. The present method permits the propulsive force pedal to be applied without exiting fuel cut-off mode.

Referring now to FIGS. 4-6, flow charts of a method for operating an engine are shown. In particular, the method of FIGS. 4-6 may be applied to enter and exit a fuel cut-off mode (e.g., where the engine is rotated and not supplied with fuel). The method of FIGS. 4-6 may be incorporated into and may cooperate with the system of FIGS. 1-2. Further, at least portions of the method of FIGS. 4-6 may be incorporated as executable instructions stored in non-transitory memory while other portions of the method may be performed via a controller transforming operating states of devices and actuators in the physical world.

At 402, method 400 determines if the propulsive effort pedal is fully released. Method 400 may determine that the propulsive effort pedal is fully released based on output of a position sensor. If method 400 judges that the propulsive effort pedal is fully released, the answer is yes and method 400 proceeds to 404. Otherwise, the answer is no and method 400 proceeds to 403.

At 403, method 400 operates the engine according to operating conditions. For example, the engine may rotate and combust fuel in response to a position of the propulsive effort pedal when the engine is activated. The engine may provide a requested torque via adjusting one or more torque actuators (e.g., fuel injector, throttle, cams, etc.). Method 400 proceeds to exit.

At 404, method 400 enters the engine into a fuel cut-off mode. In some examples, method 400 may enter the engine to the fuel cut-off mode when propulsive torque demand is at minimum level and in response to other vehicle operating conditions such as engine temperature, engine speed, torque converter status, requirements from catalyst or other emission device. Method 400 proceeds to 406.

At 406, method 400 judge if the driver has tipped-in to the propulsive effort pedal (e.g., applied the propulsive effort pedal from a base position (fully released) to an applied position). Method 400 may judge that the driver has tipped-in based on propulsive effort pedal position. Method 400 proceeds to 408.

At 408, method 400 judges if entry conditions have been met to establish a micro tip-in and latch engine fuel cut-off logic. In one example, method 400 determines if a position of the propulsive effort pedal is less than a threshold position, if a rate of change of propulsive effort pedal position is less than a threshold rate of change, and if driver demand is less than a threshold driver demand to determine if the propulsive effort pedal behavior may be classified as a micro tip-in. If these before mentioned conditions have been met, the propulsive effort pedal movement may be determined to be a micro tip-in application of the propulsive effort pedal. The thresholds for determining the presence or absence of a micro tip-in may be constant values or they may change with vehicle operating conditions. For example, the propulsive effort pedal position threshold may change as vehicle speed changes.

Method 400 may also consider if battery state of charge (SOC) is greater than a threshold SOC, if a battery discharge power is greater than a threshold discharge power limit, and if electric machine torque capability is greater than a threshold torque. An electric machine may be determined capable if a rated or maximum available torque from the electric machine minus driver demand torque and plus engine friction torque is greater than a threshold torque (e.g., Tq_MtrMax+Tq_engFric>Tq_dd+cal6, where Tq_MtrMax is max motor torque, Tq_engFric is engine friction torque, and Tq_dd is driver demand torque, cal6 is calibratable headroom, which can be a constant, or a function of vehicle states, such as speed and gear etc.). If all three conditions are met, the electric machine and the battery may be determined to be capable. Further, if the electric machine and the battery are determined to be capable and if the propulsive effort pedal conditions and driver demand conditions are met, method 400 may determine that the present tip-in is a micro tip-in. If method 400 determines that the present tip-in is a micro tip-in, the answer is yes and method 400 proceeds to 410. Otherwise, the answer is no and method 400 proceeds to 414.

At 410, method 400 judges if conditions are met for staying in engine fuel cut-off mode. Method 400 may judge if conditions ae met for staying in the engine fuel cut-off mode according to the method of FIG. 5. If method 400 judges that conditions are met to stay in engine fuel cut-off mode, the answer is yes and method 400 proceeds to 412. Otherwise, the answer is no and method 400 proceeds to 414.

At 412, method 400 judges if conditions are met for exiting the engine fuel cut-off mode. Method 400 may judge if conditions ae met for exiting the engine fuel cut-off mode according to the method of FIG. 6. If method 400 judges that conditions are met to exit the engine fuel cut-off mode, the answer is no and method 400 returns to 404. Otherwise, the answer is yes and method 400 proceeds to 414.

At 414, method 400 exits fuel cut-off mode. Method 400 may exit fuel cut-off mode by resuming fuel injection to the engine and combusting fuel in the engine. The engine may also be commanded to generate the requested driver demand torque. Method 400 proceeds to exit.

Referring now to FIG. 5, a method for determining whether or not conditions are present to stay in the engine fuel cut-off mode is shown. The method of FIG. 5 may be included as part of the method of FIG. 4.

At 502, method 500 determines an electric machine contribution torque limit. In one example, method 500 may determine the electric machine contribution torque limit from values that are stored in tables or functions in controller memory. The electric machine contribution torque limit may be determined via the following equation:

$$Tq\_mtrContMax=Tq\_MtrMax(N,Tm,V)$$

where Tq_mtrContMax is the electric machine contribution torque limit, Tq_MtrMax is a function that returns a maximum amount of torque that may be output from the electric machine, N is electric machine speed, Tm is electric machine temperature, and V is a voltage that is applied to the electric machine.

In another example, the electric machine contribution torque limit may be set or adjusted to a constant calibratable value that is less than the maximum electric machine capability Tq_mtrContMax=cal7, where Tq_mtrContMax is the electric machine contribution torque limit and cal 7 is a constant value that may be adjusted to different values.

In still another example, the electric machine contribution torque limit may be a variable value. In one example, the variable value may be a function of battery state of charge. Alternatively, the electric machine contribution torque limit may be a torque that decays with increasing time. For example, Tq_mtrContMax(k)=Tq_mtrContMax(k−1)−

Tqd_mtrContMax*dt, where Tqd_mtrContMax is a calibratable torque change rate and dt is the sampling time. Method 500 proceeds to 504.

At 504, method 500 determines an expected electric machine torque contribution if the engine stays in fuel cut-off mode. In one example, method 500 determines the expected electric machine torque contribution according to the following equation:

$$Tq\_mtrContExp = Tq\_dd - Tq\_engFric$$

where Tq_mtrContExp is the expected electric machine torque contribution of the engine stays in fuel cut-off mode, Tq_dd is the driver demand torque as determined from propulsive effort pedal position, and Tq_engFric is the engine friction torque at the present engine speed. The engine friction torque may be stored in tables or functions in controller memory and values in the table may be empirically determined via rotating the engine via an electric machine. Method 500 proceeds to 506.

At 506, method 500 judges if the electric machine contribution torque limit is greater than the expected electric machine torque contribution if the engine stays in fuel cut-off mode. This condition may be expressed as Tq_mtrContExp<Tq_mtrContMax. If method 500 judges that the electric machine contribution torque limit is greater than the expected electric machine torque contribution if the engine stays in fuel cut-off mode, then the answer is yes and method 500 proceeds to 508. Otherwise, the answer is no and method 500 proceeds to 510.

At 508, method 500 indicates that the conditions for staying in engine fuel cut-off mode during a micro tip-in are met. Method 500 may cause method 400 to proceed to 412 from 410 when conditions for staying in the engine fuel cut-off mode during the micro tip-in are met.

At 510, method 500 indicates that the conditions for staying in engine fuel cut-off mode during a micro tip-in are not met. Method 500 may cause method 400 to proceed to 414 from 410 when conditions for staying in the engine fuel cut-off mode during the micro tip-in are not met.

Referring now to FIG. 6, a method for determining whether or not conditions are present to exit the engine fuel cut-off mode is shown. The method of FIG. 6 may be included as part of the method of FIG. 4.

At 602, method 600 accumulates an amount of time that the engine has been in fuel cut-off mode since the engine most recently entered the fuel cut-off mode and a micro tip-in was determined to be present. Thus, if the engine enters fuel cut-off mode at time t1 and fuel cut-off is latched at time t2 while the engine has remained in fuel cut-off mode, time begins accumulating after time t2. The time may accumulate until the engine exits fuel cut-off mode. Alternatively, time can be accumulated from t3 to t4, and from t5 to t6, as shown in FIG. 3 where propulsive effort pedal is applied where engine remained in fuel cut-off mode. Method 600 proceeds to 604.

At 604, method 600 accumulates an amount of electric energy that is consumed by the electric machine that may deliver torque or power to the driveline (e.g., the ISG or the BISG) since the engine most recently entered the fuel cut-off mode and a micro tip-in was determined to be present. Thus, if the engine enters fuel cut-off mode at time t1 and fuel cut-off is latched at time t2 as shown in FIG. 3 while the engine has remained in fuel cut-off mode, the electric energy that is consumed by the electric machine begins accumulating after time t2. Method 600 proceeds to 606.

At 606, method 600 judges if the accumulated amount of time determined at 602 is greater than a threshold amount of time. In addition, method 600 judges if the amount of electric energy consumed by the electric machine as determined at 604 is greater than a threshold amount of electric energy. If method 600 determines that these conditions are met, the answer is yes and method 600 proceeds to 608. Otherwise, the answer is no and method 600 proceeds to 610.

At 608, method 600 indicates that the conditions for exiting in engine fuel cut-off mode during a micro tip-in are met. Method 600 may cause method 400 to proceed to 414 from 412 when conditions for exiting in the engine fuel cut-off mode during the micro tip-in are met.

At 610, method 600 indicates that the conditions for exiting in engine fuel cut-off mode during a micro tip-in are not met. Method 600 may cause method 400 to return to 404 from 412 when conditions for exiting the engine fuel cut-off mode during the micro tip-in are not met.

Thus, the method of FIGS. 4-6 provides for remaining in an engine fuel cut-off mode for tip-ins that are classified as micro tip-ins. The method of FIGS. 4-6 also provides for exiting the engine fuel cut-off mode for a tip-in that is not classified as micro tip-ins. Further, the method of FIGS. 4-6 may judge when conditions are present to stay in or exit fuel cut-off mode.

The method of FIGS. 4-6 provides for a method for operating an engine, comprising: initiating a fuel cut-off mode; and maintaining the fuel cut-off mode during a tip-in of a propulsive effort pedal; and operating an electric machine to provide propulsion of a vehicle during the tip-in. The method includes where an engine is rotating during the fuel cut-off mode. The method includes where the tip-in is a micro tip-in that is less than a threshold level. The method includes, where the micro tip-in is a tip-in where a rate of tip-in is less than a threshold rate.

In another representation, the method of FIGS. 4-6 provides for a method for operating an engine, comprising: entering the engine into a fuel cut-off mode; and causing the engine to remain in the fuel cut-off mode when a propulsive effort pedal is applied according to a classification of a tip-in of the propulsive effort pedal. The method includes where the classification is a tip-in that is a micro tip-in. The method includes where the micro tip-in is a tip-in that is less than a threshold level. The method includes where the micro tip-in is a tip-in where a rate of tip-in is less than a threshold rate. The method includes where driver demand is less than a threshold during the micro tip-in.

The method of FIGS. 4-6 also provides for causing the engine to exit the fuel cut-off mode in response to the classification being other than a micro tip-in. The method further comprises causing the engine to remain in the fuel cut-off mode in further response to a battery state of charge being greater than a threshold battery state of charge and a battery discharge power being greater than a threshold battery discharge power limit. The method further comprises causing the engine to remain in the fuel cut-off mode in further response to available torque of an electric machine being greater than driver demand torque plus engine friction torque.

The method of FIGS. 4-6 provides for a method for operating an engine, comprising: entering the engine into a fuel cut-off mode; and causing the engine to remain in the fuel cut-off mode when a propulsive effort pedal is applied, when the engine has been in the fuel cut-off mode for less than a threshold amount of time, and when an electric machine has consumed less than a threshold amount of electric energy. The method includes where the electric machine is a belt integrated starter/generator. The method includes where the electric machine is an integrated starter generator. The method further comprises remaining in the fuel cut-off mode while an expected electric machine contribution torque is less than an electric machine torque contribution threshold. The method includes where entering the engine into the fuel cut-off mode includes rotating the engine without supplying fuel to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
   initiating a fuel cut-off mode;
   maintaining the fuel cut-off mode during a tip-in of a propulsive effort pedal including causing the engine to remain in the fuel cut-off mode in further response to a battery state of charge being greater than a threshold battery state of charge and a battery discharge power being greater than a threshold battery discharge power limit; and
   operating an electric machine to provide propulsion of a vehicle during the tip-in.

2. The method of claim 1, where an engine is rotating during the fuel cut-off mode.

3. The method of claim 2, where the tip-in is a micro tip-in that is less than a threshold level.

4. The method of claim 3, where the micro tip-in is a tip-in where a rate of tip-in is less than a threshold rate.

5. The method of claim 4, where driver demand is less than a threshold during the micro tip-in.

6. The method of claim 5, further comprising causing the engine to exit the fuel cut-off mode in response to a tip-in classification being other than a micro tip-in.

7. The method of claim 1, further comprising causing the engine to remain in the fuel cut-off mode in further response to available torque of an electric machine being greater than driver demand torque plus engine friction torque.

8. A system, comprising:
   an engine in a hybrid vehicle driveline;
   an electric machine that provides propulsive force to the hybrid vehicle driveline;
   a propulsive effort pedal; and
   a controller including executable instructions stored in non-transitory memory that cause the controller to hold the engine in a fuel cut-off mode while the propulsive effort pedal is applied less than a threshold amount and while the propulsive effort pedal rate of change is less than a threshold amount.

9. The system of claim 8, further comprising additional instructions to remain in the fuel cut-off mode while an expected electric machine contribution torque is less than an electric machine torque contribution threshold.

10. The system of claim 9, where the electric machine contribution threshold is a constant.

11. The system of claim 9, where the electric machine contribution threshold varies with battery state of charge.

12. The system of claim 8, where the electric machine contribution threshold decays as a function of time.

13. The system of claim 8, further comprising additional instructions to exit the fuel cut-off mode in response to an actual total amount of time in the fuel cut-off mode exceeding a threshold amount of time.

14. The system of claim 8, further comprising additional instructions to exit the fuel cut-off mode in response to an actual total amount of energy consumed by the electric machine exceeding a threshold amount of energy.

15. A method for operating an engine, comprising:
    entering the engine into a fuel cut-off mode; and
    causing the engine to remain in the fuel cut-off mode when a propulsive effort pedal is applied, when the engine has been in the fuel cut-off mode for less than a threshold amount of time, and when an electric machine has consumed less than a threshold amount of electric energy.

16. The method of claim 15, where the electric machine is a belt integrated starter/generator.

17. The method of claim 16, where the electric machine is an integrated starter generator.

18. The method of claim 15, further comprising remaining in the fuel cut-off mode while an expected electric machine contribution torque is less than an electric machine torque contribution threshold.

19. The method of claim 15, where entering the engine into the fuel cut-off mode includes rotating the engine without supplying fuel to the engine.

* * * * *